United States Patent Office 3,553,303
Patented Jan. 5, 1971

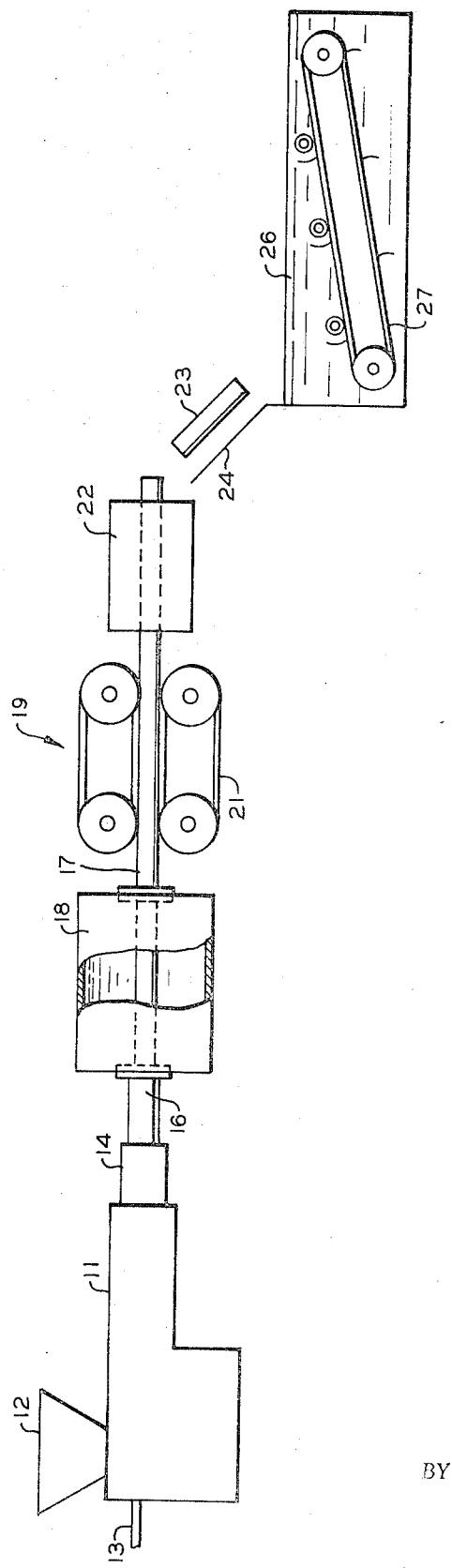

3,553,303
EXTRUDING THERMOPLASTIC TUBING
Frederick J. Zavasnik, Bartlesville, Okla., assignor to Phillips Petroleum Company, a corporation of Delaware
Filed Dec. 21, 1967, Ser. No. 692,540
Int. Cl. B29c 17/14, 25/00
U.S. Cl. 264—150                          3 Claims

ABSTRACT OF THE DISCLOSURE

A length of extruded thermoplastic tubing is immersed in a liquid quench bath while the internal surfaces of the tubing are at a temperature above the crystalline freeze point of the thermoplastic in order to prevent the formation of large crystals.

---

This invention relates to producing smooth surfaced thermoplastic tubing. In one aspect the invention relates to quenching extruded thermoplastic polymeric thermoplastic tubing.

Conventionally, when thermoplastic tubing is extruded, the external surface is cooled by contact with a liquid or gas until that surface has solidified to the extent which provides a self-supporting extrudate. The internal surface is allowed to cool by means of heat transfer through the wall of the tube to the external surface. Thus the internal surface cools at a much slower rate than the external surface. Because of this slow cooling rate, relatively large crystals or spherulites form, resulting in a rough internal tubing surface. Cooling of the internal surface of extruded tubing by introduction of a gas or liquid through the mandrel of an annular die has not been completely satisfactory. The internal coolant must be separated or insulated from the die face to prevent cooling of the melt in the die throat. Also cooling of high temperature melts is not at a rate sufficient to prevent the formation of large crystals.

By the practice of the invention, wherein an externally cooled tubing extrudate is cut and immersed in a cooling bath, the hot internal surface is rapidly quenched to provide a smooth surface which is substantially free from the undesirable large crystals.

Accordingly it is an object of the invention to provide a method of producing extruded thermoplastic tubing having a smooth internal surface.

Another object of the invention is to provide an economical method of imparting a smooth surface to thermoplastic tubing.

These and other objects of the invention will be apparent to one skilled in the art upon consideration of the following disclosure, the drawing and appended claims.

The drawing is a schematic illustration of apparatus utilized in the practice of the invention.

According to the invention, there is provided a method of producing thermoplastic tubing having a smooth internal surface comprising extruding a molten polymeric thermoplastic material in the form of a tube, cooling the external surface of the tube to a temperature below the crystalline freezing point of the material while maintaining the internal surface of the tube at a temperature above the crystalline freezing point, cutting the externally cooled tube transversely and immersing the cut length of tubing in a liquid bath maintained at a temperature sufficient to cool the internal surface of the tubes to a temperature below the crystalline freeze point of the polymeric material at a rate sufficient to prevent information of large crystals.

Crystalline freeze point as used in the description of the invention is taken to mean that temperature during cooling of a molten polymer at which the bulk of crystallization occurs. This temperature is of course dependent upon the particular polymer being cooled and the rate of cooling. For example, polypropylene having a melting point of 340° F. has a crystalline freezing point of 257° F. when cooled at a rate of 2° per minute but has a crystalline freezing point of 212° F. when quenched or shock cooled.

Thermoplastic materials used in the practice of the invention are those polymeric materials which are solid at atmospheric temperatures, which soften under heat and/or pressure to permit extrusion, and which exhibit a crystalline freeze point. Polyethylene and polypopylene are exemplary of such materials.

Referring now to the drawing, the invention will be described in detail. Reference numeral 11 designates a conventional extruder to which particulate polymeric thermoplastic material, such as polypropylene, is supplied by means of a hopper 12. Extruder 11 is provided with suitable heating means to melt the thermoplastic material. The plasticized material is passed through the extruder by means of a conveying screw rotatably mounted therein which is driven by shaft 13 having a suitable driving motor (not shown). The molten thermoplastic material is passed from extruder 11 into die 14 from which it is extruded through an annular opening in the shape of a tube. The extruded tubing passes through sizing means 16 to obtain proper regulation of the tubing dimensions.

The extruded thermoplastic tubing 17 passes through a cooling bath 18 or the like wherein the external surface of the tube is cooled to a temperature below the crystalline freeze point of the polymeric material. The cooling obtained in bath 18 is sufficient to provide a self-supporting tube at the exit from the bath but the internal surface of the tube remains at a temperature above the crystalline freeze point and depending upon the wall thickness of the extruded tube the internal surface may be molten.

Pulling means 19, having resilient or contoured belts 21 to avoid deformation of the hot tubing, are utilized to draw the tube through bath 18 and pass it to cutting means 22 which transversely cuts the tubing into desired lengths. Suitable means for cutting the extruded tube are disclosed in copending application Ser. No. 637,692 to Joel T. Hicks, for Cutting Apparatus.

The cut length of tubing 23 passes down chute 24 into cooling bath 26 wherein it is immersed in liquid maintained at a temperature sufficiently low to cool the internal surface rapidly and prevent the formation of large crystals. Because the tube is immersed and the liquid is uniformly in contact with the internal surface, heat transfer is at a high rate and refrigeration of the bath is not generally necessary. Tap water circulating in the bath is one economical cooling liquid. The quenched tube 23 can be removed manually or by any conventional means such as conveyor 27.

The tube produced by the practice of the invention exhibits a smooth glossy internal surface. This characteristic is highly desirable when producing parisons for blow molding since interior surface roughness of a parison diffuses light and decreases the transparency of the molded product.

EXAMPLE

Commercially available polypropylene having a melt index of 3.5 as determined by ASTM D–1238–62T, a crystalline melt point of 340° F., and a crystalline freeze point of about 210–260° F. was extruded at a melt temperature of about 450° F. in the form of a tube having an outside diameter of .850 inch and a wall thickness of 125 mils. The tubing was extruded at a rate of 16 feet per minute. After sizing, the extruded tube was passed through a 12-foot long tank containing water at a temperature of 50° F. to cool the external surface. Upon exit from the bath the external surface had a temperature of approximately 160° F. The tubing was cut into 20½-inch lengths and immersed in a quench bath containing water at about 50° F. for about 10–20 seconds. The internal surface of the quenched tube was smooth and glossy. No spherulites were apparent. The quenched tubing was blow molded into bottles which exhibited a high degree of transparency. When extruding polypropylene it is preferred to cool the external surface to a temperature from about 160 to 190° F. to provide a self-supporting extrudate while maintaining the internal surface at a temperature above 260° F. The liquid in which the polypropylene extrudate is immersed is generally maintained at a temperature from about 40 to 80° F.

Reasonable modification and variation are within the scope of the invention which sets forth a novel method of producing thermoplastic tubing having smooth internal surfaces.

That which is claimed is:

1. A method of producing thermoplastic tubing having a smooth internal surface comprising:

extruding molten polymeric thermoplastic material in the form of a continuous tube;

cooling the external surface of said tube to a temperature below the crystalline freezing point of said polymeric material while maintaining the internal surface of said tubing at a temperature above the crystalline freezing point of said polymeric material;

cutting said tubing transversely while the internal surface is at a temperature above the crystalline freezing point of said polymeric material;

immersing the cut length of tubing in a liquid bath maintained at a temperature sufficient to cool the internal surface of said tubing to a temperature below the crystalline freezing point of said polymeric material at a rate sufficient to prevent the formation of large crystals.

2. The method of claim 1 wherein said polymeric material comprises polypropylene, said external surface is cooled to about between 160 and 190° F. while said internal surface is maintained at a temperature above 260° F., and said internal surface is quenched by immersion in a water bath maintained at about between 40–80° F.

3. The method of claim 1 wherein said external surface is cooled by contact with a liquid.

References Cited

UNITED STATES PATENTS

| | | | |
|---|---|---|---|
| 2,612,656 | 10/1952 | Lyon | 264—150X |
| 2,987,768 | 6/1961 | Given | 264—179 |
| 3,121,760 | 2/1964 | Kline | 264—178X |
| 3,427,375 | 2/1969 | Turner | 264—209X |

ROBERT F. WHITE, Primary Examiner

A. M. SOKAL, Assistant Examiner

U.S. Cl. X.R.

264—237